(12) United States Patent
Izumi et al.

(10) Patent No.: US 9,858,473 B2
(45) Date of Patent: Jan. 2, 2018

(54) MAKEUP SUPPORTING DEVICE, MAKEUP SUPPORTING METHOD, AND NON-TRANSITORY COMPUTER-READABLE RECORDING MEDIUM

(71) Applicant: Panasonic Intellectual Property Management Co., Ltd., Osaka (JP)

(72) Inventors: Keiko Izumi, Ishikawa (JP); Youichi Gouda, Ishikawa (JP); Tomofumi Yamanashi, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 262 days.

(21) Appl. No.: 14/715,591

(22) Filed: May 19, 2015

(65) Prior Publication Data

US 2015/0254500 A1 Sep. 10, 2015

Related U.S. Application Data

(63) Continuation of application No. PCT/JP2014/004296, filed on Aug. 21, 2014.

(30) Foreign Application Priority Data

Aug. 30, 2013 (JP) ................... 2013-179664

(51) Int. Cl.
*G06K 9/00* (2006.01)
*G06T 11/60* (2006.01)
(Continued)

(52) U.S. Cl.
CPC ....... *G06K 9/00268* (2013.01); *A45D 44/005* (2013.01); *G06K 9/00281* (2013.01);
(Continued)

(58) Field of Classification Search
CPC ....... G06K 9/00268; H04N 7/18; G06T 11/60
(Continued)

(56) References Cited

U.S. PATENT DOCUMENTS

2007/0019882 A1* 1/2007 Tanaka ................ G06T 11/00
382/276
2007/0255589 A1* 11/2007 Rodriguez .......... G06F 19/3437
705/2
(Continued)

FOREIGN PATENT DOCUMENTS

JP 5-197793 8/1993
JP 11-025253 1/1999
(Continued)

OTHER PUBLICATIONS

The Extended European Search Report dated Aug. 9, 2016 for the related European Patent Application No. 14840216.7.
(Continued)

*Primary Examiner* — Tung Vo
*Assistant Examiner* — Zaihan Jiang
(74) *Attorney, Agent, or Firm* — Greenblum & Bernstein, P.L.C.

(57) ABSTRACT

A makeup supporting device includes: an image acquisition unit that acquires a facial image that is an image obtained by photographing a face; a threshold determining unit that determines a pixel value threshold based on a partial image of the facial image, the partial image being an image in a region that does not include an outer end of an eyebrow but includes an inner end of the eyebrow and a periphery of the inner end of the eyebrow; an eyebrow region extracting unit that extracts an eyebrow region from the facial image using the threshold; an eyebrow eraser that performs eyebrow erasing processing on the facial image, the eyebrow erasing processing being processing of filling in the eyebrow region using preferentially a color on an inner end side of the eyebrow from among colors in regions around the eyebrow region; and a display unit that displays the facial image after the eyebrow erasing processing is performed.

14 Claims, 13 Drawing Sheets

(51) Int. Cl.
  *H04N 7/18* (2006.01)
  *A45D 44/00* (2006.01)
  *G06T 5/00* (2006.01)
  *H04N 1/62* (2006.01)
  *G06T 7/11* (2017.01)
  *G06T 7/136* (2017.01)

(52) U.S. Cl.
  CPC ............ *G06T 5/005* (2013.01); *G06T 7/11* (2017.01); *G06T 7/136* (2017.01); *G06T 11/60* (2013.01); *H04N 1/62* (2013.01); *H04N 7/18* (2013.01); *G06T 2207/30201* (2013.01)

(58) Field of Classification Search
  USPC .......................................................... 348/78
  See application file for complete search history.

(56) References Cited

U.S. PATENT DOCUMENTS

2012/0044335 A1* 2/2012 Goto ................ A45D 44/005
  348/77
2012/0327196 A1* 12/2012 Ohba ................ G06K 9/00281
  348/49

FOREIGN PATENT DOCUMENTS

| JP | 2000011144 A * | 1/2000 |
| JP | 2001-346627 | 12/2001 |
| JP | 2003-044837 | 2/2003 |
| JP | 2007-175384 | 7/2007 |
| JP | 2007-188407 | 7/2007 |
| JP | 2007-257165 | 10/2007 |
| WO | 2009/022631 | 2/2009 |
| WO | 2009/093185 | 7/2009 |

OTHER PUBLICATIONS

Wai-Shun Tong et al: "Example-Based Cosmetic Transfer", Computer Graphics and Applications, 2007. PG '07. 15th Pacific Conference on, IEEE, Piscataway, NJ, USA, Oct. 29, 2007 (Oct. 29, 2007), pp. 211-218, XP031221761.

International Search Report of PCT application No. PCT/JP2014/004296 dated Nov. 25, 2014.

Nobuyuki Otsu "An Automatic Threshold Selection Method Based on Discriminant and Least Squares Criteria" vol. 63-D, No. 4, pp. 349-356, Apr 1980.

\* cited by examiner

| MAKEUP PATTERN (501) | MAKEUP ID (502) |
|---|---|
| MP1 | FM1, FM2 |
| MP2 | FM2, FM3 |
| MP3 | FM4, FM5 |
| ⋮ | ⋮ |

| MAKEUP ID (511) | MAKEUP TYPE (512) | COLOR (513) | DENSITY (514) | AREA (515) |
|---|---|---|---|---|
| FM1 | T1 | C1 | D1 | A1 |
| FM1 | T2 | C2 | D2 | A2 |
| FM1 | T3 | C3 | D3 | A3 |
| ⋮ | ⋮ | ⋮ | ⋮ | ⋮ |

| FACIAL COMPONENT ID (621) | REGION (622) | PERSON ID (623) |
|---|---|---|
| P1 | R1 | H1 |
| P2 | R2 | H2 |
| ⋮ | ⋮ | ⋮ |

US 9,858,473 B2

MAKEUP SUPPORTING DEVICE, MAKEUP SUPPORTING METHOD, AND NON-TRANSITORY COMPUTER-READABLE RECORDING MEDIUM

BACKGROUND

1. Field of the Invention

The present disclosure relates to a makeup supporting device, a makeup supporting method, and a non-transitory computer-readable recording medium for supporting facial makeup.

2. Description of the Related Art

Nowadays, a way of facial makeup (hereinafter, simply referred to as "makeup") is diversifying. It is difficult, particularly for a person who has insufficient knowledge about the makeup, to select proper makeup from countless options. This is because it takes an enormous amount of time and effort to actually try every makeup to determine and compare the makeup.

In view of the above, for example, PTLs 1 and 2 disclose technologies for generating and presenting a simulation image of a face when makeup is applied. In the technologies of PTLs 1 and 2, there is acquired an image obtained by photographing a face of a makeup target (hereinafter, simply referred to as a "face") (hereinafter, such an image is referred to as a "facial image"). In the technologies of PTLs 1 and 2, an image indicating a state in which the makeup is applied to the face is superimposed on the facial image to generate a simulation image and display the generated simulation image.

According to the technologies of PTLs 1 and 2, suitability of the makeup can be determined without actually applying the makeup. That is, the proper makeup can be selected with less time and effort.

Meanwhile, in the actual makeup, it is popularly practiced that eyebrow-paint is applied after eyebrow hairs are removed. In generating the simulation image for such makeup, desirably the facial image is prepared with no eyebrow.

In view of the above, for example, PTLs 3 and 4 disclose technologies for erasing the eyebrows from the facial image. In the technology of PTL 3, a designation of an eyebrow region in the facial image is received from a user, and a color identical to that of a neck region in the facial image is applied to a slightly wide region including the eyebrow region. In the technology of PTL 4, an eyebrow contour is searched in the facial image, and slightly wide region including a region surrounded by the eyebrow contour is filled with a color around the eyebrow contour.

According to the technologies of PTLs 3 and 4, the eyebrow-less facial image can be obtained without actually removing the eyebrow hairs.

CITATION LIST

Patent Literatures

PTL 1: Unexamined Japanese Patent Publication No. 2001-346627

PTL 2: Unexamined Japanese Patent Publication No. 2007-175384

PTL 3: Unexamined Japanese Patent Publication No. 2007-257165

PTL 4: International Patent Publication No. 2009/022631

PTL 5: Unexamined Japanese Patent Publication No. 2003-44837

Non-Patent Literature

NPL 1: Nobuyuki Otsu, "An Automatic Threshold Selection Method Based on Discriminant and Least Square Criteria", IEICE Transaction D, Vol. J63-D, No. 4, pp. 349-356, April 1989

However, in the conventional technologies of PTLs 3 and 4, there is a possibility of generating an unnatural facial image largely different from the facial image in a case where the eyebrow hairs are actually removed.

The reason is as follows. A skin color near the eyebrow is often different from a skin color of the neck region. For this reason, in the technology of PTL 3, there is a possibility that only the color in the eyebrow region does not match. Moreover, bangs often cover the area near the eyebrow, particularly on an outer end side of the eyebrow. For this reason, in the technology of PTL 4, there is a possibility that the color in the eyebrow region is filled with the skin color mixed with a color of the hair. In both the technologies of PTLs 3 and 4, there is a possibility that a false region is determined or detected as the eyebrow region so that the eyebrow color remains partially or an eye region is filled in.

In the case where the facial image after processing of erasing the eyebrows (hereinafter, referred to as an "image in which the eyebrows are erased") becomes unnatural, the simulation image also becomes unnatural, and thus it is difficult for the user to determine suitability of the makeup. For this reason, it is desirable to obtain the image as similar to the state in which the eyebrow hairs are actually removed as possible.

SUMMARY OF THE INVENTION

One non-limiting and exemplary embodiment provides a makeup supporting device, a makeup supporting method, and a non-transitory computer-readable recording medium for being able to obtain an image closer to the state in which the eyebrow hairs are actually removed.

In one general aspect, the techniques disclosed here feature a makeup supporting device includes: an image acquisition unit that acquires a facial image that is an image obtained by photographing a face; a threshold determining unit that determines a pixel value threshold based on a partial image of the facial image, the partial image being an image in a region that does not include an outer end of an eyebrow but includes an inner end of the eyebrow and a periphery of the inner end of the eyebrow; an eyebrow region extracting unit that extracts an eyebrow region from the facial image using the threshold; an eyebrow eraser that performs eyebrow erasing processing on the facial image, the eyebrow erasing processing being processing of filling in the eyebrow region using preferentially a color on an inner end side of the eyebrow from among colors in regions around the eyebrow region; and a display unit that displays the facial image after the eyebrow erasing processing is performed.

Accordingly, the facial image closer to the state in which the eyebrow hairs are actually removed can be obtained in the present disclosure.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium a, or any selective combination thereof.

BRIEF DESCRIPTION OF DRAWINGS

FIG. 13 is a view illustrating an example of contents of a makeup table according to the second exemplary embodiment;

FIG. 14 is a view illustrating an example of contents of a makeup information table according to the second exemplary embodiment;

FIG. 17 is a view illustrating an example of facial component information generated according to the second exemplary embodiment;

DETAILED DESCRIPTION

Exemplary embodiments of the present disclosure will be described in detail below with reference to the drawings.

First Exemplary Embodiment

A first exemplary embodiment of the present disclosure is an example of a basic mode of the present disclosure.

Figure 1:
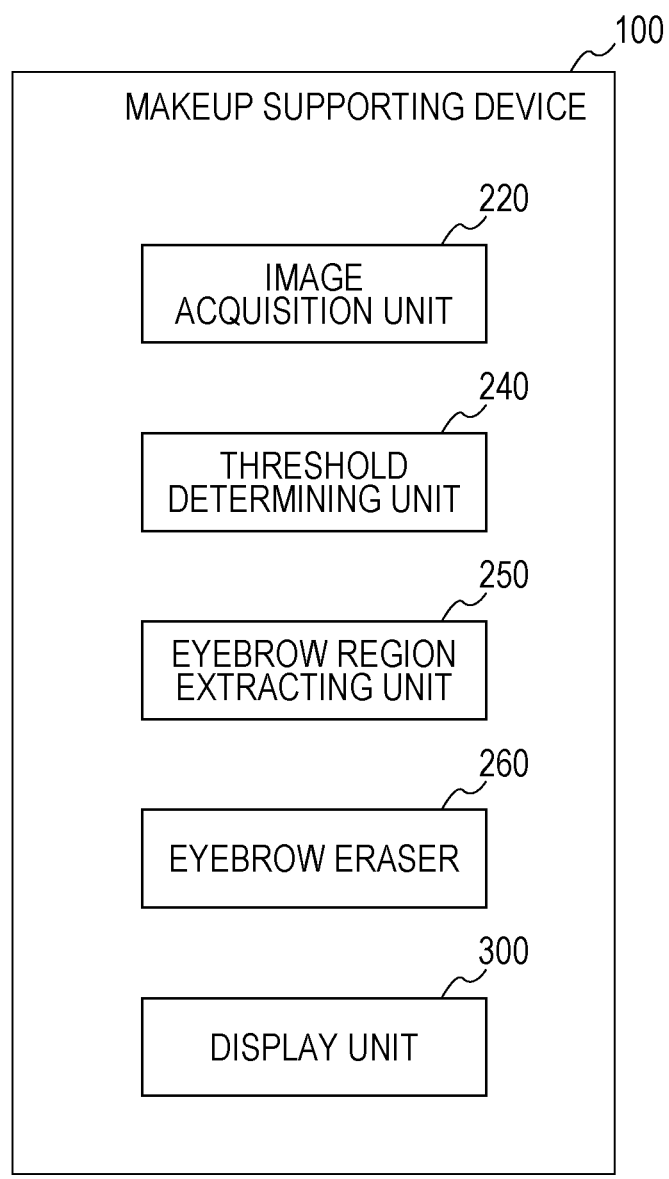
FIG. 1 is a block diagram illustrating an example of a configuration of a makeup supporting device according to a first exemplary embodiment of the present disclosure.

FIG. 1 is a block diagram illustrating an example of a configuration of a makeup supporting device according to the first exemplary embodiment.

Referring to FIG. 1, makeup supporting device 100 includes image acquisition unit 220, threshold determining unit 240, eyebrow region extracting unit 250, eyebrow eraser 260, and display unit 300.

Image acquisition unit 220 acquires a facial image that is an image obtained by photographing a face. For example, the face to be photographed is a face of a makeup target.

In order to define an eyebrow region, threshold determining unit 240 determines a pixel value threshold based on a partial image of the facial image acquired by image acquisition unit 220, the partial image being an image in a region which does not include an outer end of an eyebrow but includes an inner end of the eyebrow and a periphery of the inner end of the eyebrow.

Using the threshold determined by threshold determining unit 240, eyebrow region extracting unit 250 extracts the eyebrow region from the facial image acquired by image acquisition unit 220.

Eyebrow eraser 260 performs eyebrow erasing processing. The eyebrow erasing processing is processing of filling in the eyebrow region on the facial image using preferentially a color on an inner end side of the eyebrow from among colors of regions around the eyebrow region extracted by eyebrow region extracting unit 250.

Display unit 300 displays the facial image after eyebrow eraser 260 performs the eyebrow erasing processing.

Although not illustrated, for example, makeup supporting device 100 includes a CPU (Central Processing Unit), a storage medium such as a ROM (Read Only Memory) in which a control program is stored, and a working memory such as a RAM (Random Access Memory). In this case, the CPU executes the control program to implement a function of each of the above units.

Makeup supporting device 100 can extract and fill in the eyebrow region based on image information about a region on the inner end side of the eyebrow, the region being closer to the eyebrow and having a higher possibility that the hair does not cover the eyebrow. Accordingly, makeup supporting device 100 can more accurately extract the eyebrow region, and fill the eyebrow region with a more proper color. Therefore, makeup supporting device 100 can obtain an image in which eyebrows are erased, the image being closer to the facial image in the case where eyebrow hairs are actually removed.

Second Exemplary Embodiment

A second exemplary embodiment of the present disclosure is an example of a specific mode of the present disclosure. The second exemplary embodiment is an example in which the present disclosure is applied to a device including a digital video camera and a touch-panel-equipped display.

<Description of Term>

Terms used in the second exemplary embodiment will now be described.

"Facial components" mean parts constituting the face such as an eye, an eyebrow, a nose, a cheekbone, a lip, and a contour.

A "facial component ID" means identification information on each of the facial components.

"Facial component regions" mean regions occupied by the facial components on an image or a real space, and include positions of feature points of the facial components, such as the inner end of the eyebrow, and the outer end of the eyebrow, an inner corner of an eye, and an outer corner of the eye.

"Makeup" means makeup ways (kinds), such as eyebrow-paint and eye shadow, which correct an impression of a feature of the facial components to enhance appearance, and the makeup includes at least a dye color, an application density, and an application area.

"Makeup information" means information indicating details of the makeup, and includes at least information (information indicating a difference from a facial color) necessary for the generation of the image, in which the makeup is applied to the face, from the facial image.

"Makeup types" mean makeup kinds including "foundation", "eyebrow-paint", "eye shadow", "lipstick", and "cheek makeup", which are distinguished by a positional relationship with at least the facial components.

A "makeup ID" means identification information on each of the makeup.

A "makeup image" means an image indicating a makeup state in which the makeup is applied to the face.

<Configuration of Makeup Supporting Device>

A configuration of the makeup supporting device according to the second exemplary embodiment will be described below.

Figure 2:
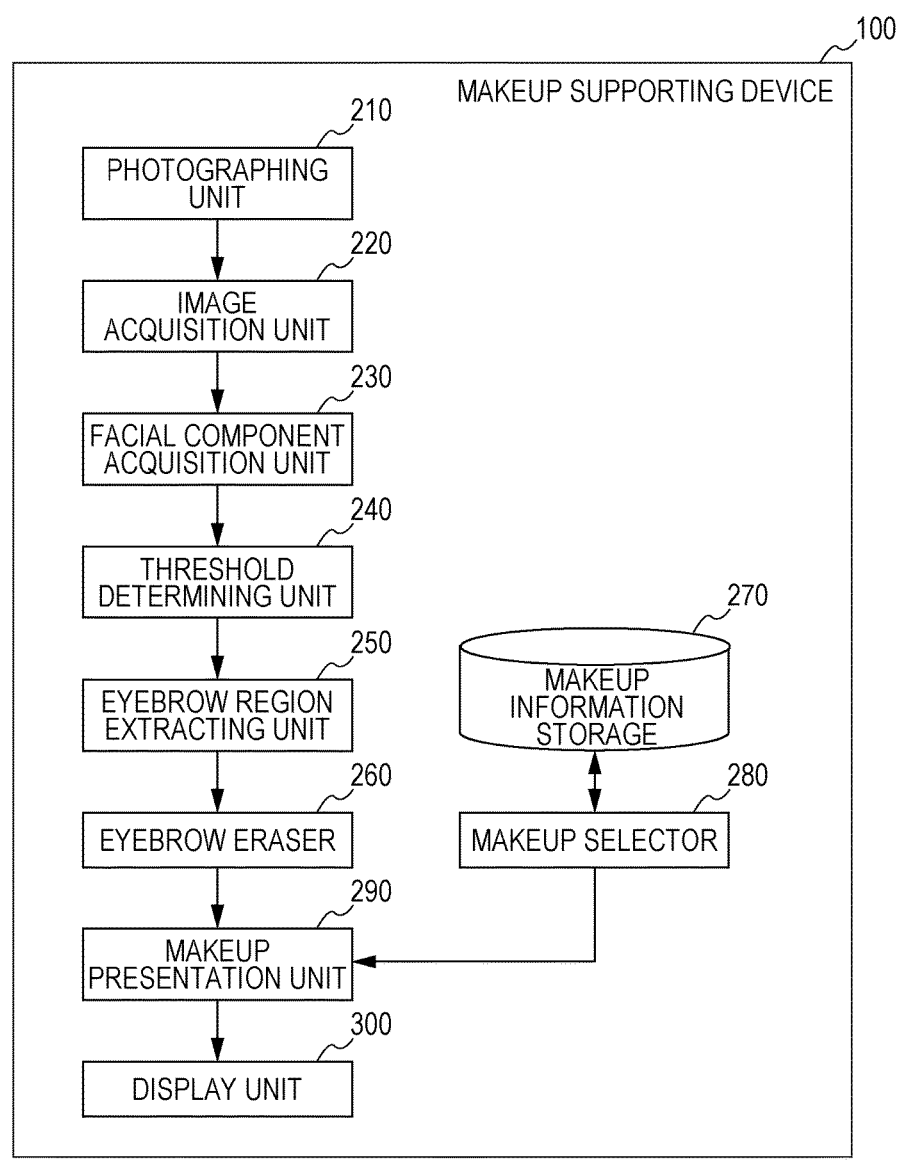
FIG. 2 is a block diagram illustrating an example of a configuration of a makeup supporting device according to a second exemplary embodiment of the present disclosure.

FIG. 2 is a block diagram illustrating an example of the configuration of the makeup supporting device according to the second exemplary embodiment.

Referring to FIG. 2, makeup supporting device 100 includes photographing unit 210, image acquisition unit 220, facial component acquisition unit 230, threshold determining unit 240, eyebrow region extracting unit 250, eyebrow eraser 260, makeup information storage 270, makeup selector 280, makeup presentation unit 290, and display unit 300.

An example of photographing unit 210 includes a digital video camera, and photographing unit 210 photographs a video image of the face becoming a makeup simulation target. Photographing unit 210 then outputs the photographed video image to image acquisition unit 220. The video image includes a plurality of time-series images (frame images). In the second exemplary embodiment, it is assumed that the face becoming the makeup simulation target is a face of a user using makeup supporting device 100.

Image acquisition unit 220 sequentially acquires the images constituting the video image from the input video image. Image acquisition unit 220 then outputs the acquired image (hereinafter, referred to as a "photographed image") to facial component acquisition unit 230. Herein, image acquisition unit 220 desirably performs image processing of mirror-reversing the photographed image in order to give the user a feeling of applying the makeup while looking into a mirror. In addition, the photographed image includes a part of the image of the face becoming the makeup simulation target (hereinafter, referred to as a "facial image").

Facial component acquisition unit 230 acquires a facial component region of the face from the input image. For example, the facial component region is acquired by matching of each partial region of the image with a template of each of previously-prepared facial components (for example, see PTL 5). Herein, the acquisition of the facial component region includes the extraction of feature points of each of the facial components (hereinafter, referred to as a "facial feature points"), including eyebrow feature points and eye feature points. Facial component acquisition unit 230 then outputs facial component information to threshold determining unit 240 together with the photographed image. As used herein, the facial component information means information indicating the identification information and the regions of the acquired facial components (including identification information and positions of the facial feature points).

Threshold determining unit 240 extracts a threshold determining image from the facial image. The threshold determination image includes a region used to determine a later-described binarization threshold. In the second exemplary embodiment, the threshold determination image is an image in a region, which does not include the outer end of the eyebrow but includes the inner end of the eyebrow and the periphery of the inner end of the eyebrow, in the facial image. The threshold determination image is also an image in a region that has a predetermined size and shape based on a position of the inner end of the eyebrow.

Then, threshold determining unit 240 determines a binarization threshold based on the extracted threshold determination image on the assumption that the image includes only the skin region and the eyebrow region. As used herein, the binarization threshold means the pixel value threshold used to define the eyebrow region. Threshold determining unit 240 then outputs the determined binarization threshold to eyebrow region extracting unit 250 together with the photographed image and the facial component information. A threshold determination image extracting technique and a binarization threshold determining technique are described in detail later.

Eyebrow region extracting unit 250 estimates an intermediate region in the photographed image using the facial component information. As used herein, the intermediate region means a rough region occupied by the eyebrow. Eyebrow region extracting unit 250 binarizes the photographed image using a binarization threshold. Then, eyebrow region extracting unit 250 estimates the eyebrow region in the photographed image based on an edge of the binary image included in the estimated intermediate region. Hereinafter, the estimated eyebrow region (that is, the eyebrow region defined by the binarization threshold) is referred to as a "binary eyebrow region".

Moreover, eyebrow region extracting unit 250 extracts a region where the binary eyebrow region is expanded, as the final eyebrow region. Hereinafter, the region extracted as the final eyebrow region is simply referred to as an "eyebrow region". Threshold determining unit 240 then outputs information indicating the eyebrow region (hereinafter, referred to as "eyebrow region information") to eyebrow eraser 260 together with the photographed image and the facial component information. An intermediate region estimating technique and an eyebrow region extracting technique are described in detail later.

Eyebrow eraser 260 performs the eyebrow erasing processing of filling in the eyebrow region on the facial image based on the photographed image, the facial component information, and the eyebrow region information. In the second exemplary embodiment, the eyebrow erasing processing is processing of filling in the eyebrow region on the facial image using preferentially the color on the inner end side of the eyebrow from among colors of regions around the eyebrow region. More specifically, for example, the eyebrow erasing processing is processing of sequentially interpolating the color of the image in which the image of the eyebrow region is deleted from the facial image, in a direction from the inner end side of the eyebrow toward the outer end side of the eyebrow. Eyebrow eraser 260 then outputs the photographed image on which the eyebrow erasing processing is already performed (hereinafter, referred to as an "image in which the eyebrows are erased") to makeup presentation unit 290 together with the facial component information. The eyebrow erasing processing is described in detail later.

A makeup table and a makeup information table are stored in makeup information storage 270. The makeup table defines a plurality of makeup patterns that are makeup patterns of the whole face. In the makeup information table, the makeup information is described in each makeup type constituting the makeup pattern. The makeup information means information in which details of makeup are described while associated with the facial component region (the positions of the facial feature points). Contents of the makeup table and makeup information table are described in detail later.

Makeup selector 280 receives a user's selection manipulation to select one makeup pattern from the plurality of makeup patterns described in the makeup information table. For example, the selection manipulation is performed through the touch-panel-equipped display. Then, makeup selector 280 acquires the makeup information corresponding to the selected makeup pattern from the makeup information table, and outputs the acquired makeup information to makeup presentation unit 290.

Makeup presentation unit 290 generates a simulation image based on the makeup information. The simulation image is obtained by superimposing the makeup image on the image in which the eyebrows are erased. For example, the makeup that becomes the simulation image generation target includes the makeup of the eyebrow. Makeup presentation unit 290 then outputs the generated simulation image to display unit 300. A simulation image generating technique is described in detail later.

For example, display unit 300 includes a display part of the touch-panel-equipped display. Display unit 300 displays the simulation image based on image data of the input simulation image. More specifically, display unit 300 sequentially displays the simulation image along the photographed video image.

Although not illustrated, for example, makeup supporting device 100 includes a CPU, a storage medium such as a ROM in which the control program is stored, and a working memory such as a RAM. In this case, the CPU executes the control program to implement a function of each of the above units.

Makeup supporting device 100 can extract and fill in the eyebrow region based on image information about a region on the inner end side of the eyebrow, the region being closer to the eyebrow and having a higher possibility that the hair does not cover the eyebrow.

The partial image extracting technique, the binarization threshold determining technique, the intermediate region extracting technique, the eyebrow region extracting technique, the eyebrow erasing processing, the contents of the makeup table, and the contents of the makeup information table will be described in turn in detail below.

<Threshold Determination Image Extracting Technique>

Figure 3:
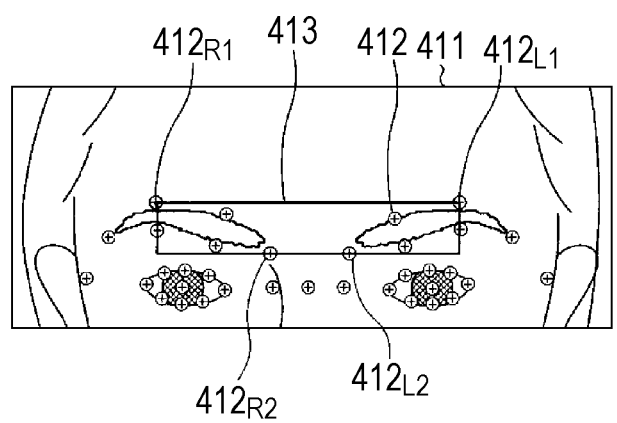
FIG. 3 is a view illustrating a first example of a partial image extracting technique according to the second exemplary embodiment.

FIG. 3 is a view illustrating a first example of the threshold determination image extracting technique.

As illustrated in FIG. 3, it is assumed that a plurality of facial feature points 412 (in FIG. 3, indicated by marks with a circle having a cross therein) are extracted from facial image (only a part is illustrated) 411. The facial feature points include facial feature points 412L1 and 412R1 respectively corresponding to highest points of the arches of left and right eyebrows, and facial feature points 412L2 and 412R2 respectively corresponding to the inner ends of the left and right eyebrows.

As illustrated in FIG. 3, for example, threshold determining unit 240 sets rectangular region 413. Rectangular region 413 has facial feature points 412L1 and 412R1 respectively corresponding to highest points of the arches of the left and right eyebrows as left and right upper vertices of the rectangular region, and passes through facial feature points 412L2 and 412R2 respectively corresponding to the inner ends of the left and right eyebrows. Then, threshold determining unit 240 extracts the image in the region corresponding to set rectangular region 413 in facial image 411 as the threshold determination image used to determine the binarization threshold.

Figure 4:
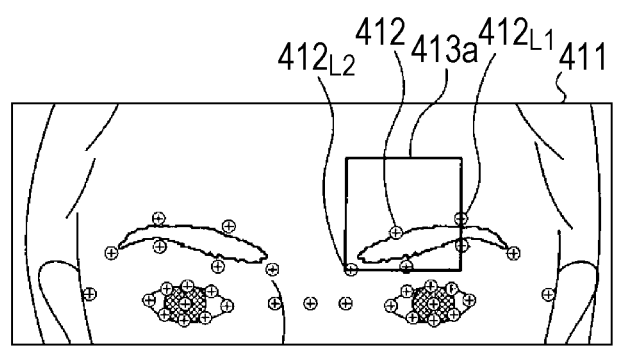
FIG. 4 is a view illustrating a second example of the partial image extracting technique according to the second exemplary embodiment.

FIG. 4 is a view illustrating a second example of the threshold determination image extracting technique, and corresponds to FIG. 3. Parts identical to those in FIG. 4 are designated by the identical reference marks, and the description thereof is omitted.

As illustrated in FIG. 4, threshold determining unit 240 sets square region 413a. Square region 413a has facial feature point 412L2 corresponding to the inner end of the left eyebrow as a lower vertex, passes through facial feature point 412L1 corresponding to the highest point of the arch of the left eyebrow, and has a horizontal distance between facial feature points 412L2 and 412L1 as a length of one side. Then, threshold determining unit 240 extracts the image in the region corresponding to set square region 413a in facial image 411 as the threshold determination image.

The threshold determination image thus extracted has a low possibility of including the eye and bangs, and therefore the threshold determination image has a feature of a high possibility of including only the skin region and the eyebrow region. Moreover, the region having a predetermined size and shape is easily set based on the position of the inner end of the eyebrow. Accordingly, threshold determining unit 240 can easily set the region having the high possibility of including only the skin region and the eyebrow region as the region used to determine the binarization threshold.

Herein, in the threshold determination image extracted by the technique illustrated in FIG. 3, the later-described binarization threshold can accurately be determined particularly when the face is oriented forward. In addition, in the threshold determination image extracted by the technique illustrated in FIG. 4, the later-described binarization threshold can accurately be determined particularly when the face is laterally oriented. Moreover, in the case where one of the eyebrows is covered with the bangs although the face is oriented forward, the later-described binarization threshold can accurately be determined by applying the technique illustrated in FIG. 4 to the other eyebrow.

<Binarization Threshold Determining Technique>

For example, using a technique called Otsu's binarization (also called an "Otsu technique" or a "discriminant analysis method"), threshold determining unit 240 obtains the binarization threshold that is a threshold suitable for defining the eyebrow region based on the extracted threshold determination image. The Otsu's binarization is a technique of determining a proper threshold in the case where a set of given values is classified into two classes (for example, see NPL 1). Thus, the eyebrow can accurately be extracted irrespective of the skin color and the eyebrow color when not a fixed value but a proper value selected from the image is used as the binarization threshold.

When the binarization threshold is determined by the technique, the binary image is obtained in subsequent eyebrow region extracting unit 250 such that a boundary between the eyebrow and the skin constitutes the edge.

<Intermediate Region Estimating Technique>

Figure 5:
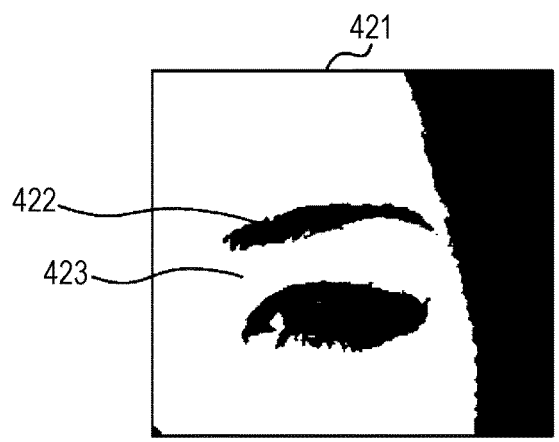
FIG. 5 is a view illustrating an example of a binary image according to the second exemplary embodiment.

FIG. 5 is a view illustrating an example of a peripheral part of the left eyebrow in the binary image.

As illustrated in FIG. 5, binary image 421 includes region 422 that is classified into the eyebrow by the binarization threshold (indicated in black in FIG. 5, hereinafter referred to as a "eyebrow determination region") and region 423 that is not classified into the eyebrow by the binarization threshold (indicated in white in FIG. 5, hereinafter referred to as a "non-eyebrow determination region"). However, actually eyebrow determination region 422 in binary image 421 may include regions such as the eye region and the like other than the eyebrow.

Therefore, eyebrow region extracting unit 250 estimates the intermediate region based on an eyebrow including region and an eye including region. As used herein, the eyebrow including region means a region which includes the whole eyebrow and is estimated from the positions of the facial feature points of the eyebrow. Moreover, the eye including region means a region which includes the whole eye and is estimated from the positions of the facial feature points of the eye.

Figure 6:
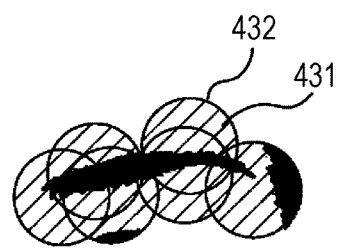
FIG. 6 is a view illustrating an example of an eyebrow including region according to the second exemplary embodiment.
Figure 7:
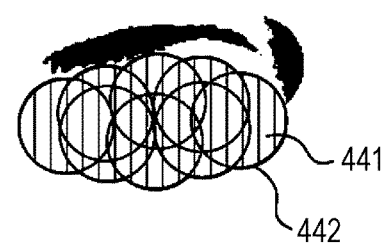
FIG. 7 is a view illustrating an example of an eye including region according to the second exemplary embodiment.

FIG. 6 is a view illustrating an example of the eyebrow including region. FIG. 7 is a view illustrating an example of the eye including region.

As illustrated in FIG. 6, eyebrow including region 431 (the region indicated by diagonal hatching) is a set of small regions 432 based on the positions of the facial feature points (see FIG. 4) of the eyebrow. Moreover, as illustrated in FIG. 7, eye including region 441 (the region indicated by vertical hatching) is a set of small regions 442 based on the positions of the facial feature points (see FIG. 4) of the eye.

In binary image 421 of FIG. 5, eyebrow region extracting unit 250 sets the region, where eye including region 441 illustrated in FIG. 7 is excluded from eyebrow including region 431 illustrated in FIG. 6, to the intermediate region.

Herein, for example, a maximum distance between the facial feature points adjacent to each other, such as a distance between the facial feature point corresponding to the highest point of the arch of the eyebrow and the facial feature point on inner end side of the eyebrow on the lower side of the eyebrow, or a distance between the two facial feature points on the upper side of the eyebrow, may be used as a diameter of small region 432 associated with the eyebrow. However, there is a high possibility that the hair is located close to a surrounding area of the outer end of the eyebrow. Moreover, in the eyebrow, usually a part closer to the inner or outer end of the eyebrow is narrower than other parts. Accordingly, only the diameter of small region 432 is desirably set smaller than other regions with respect to the facial feature point of the outer end (and inner end) of the eyebrow (for example, a half diameter). Accordingly, the parts such as the hair and the like other than the eyebrow are not included in small region 432 associated with the eyebrow.

For example, the diameter of small region 442 associated with the eye may be set to a distance between the facial feature point corresponding to a center on the upper side of the eye and the facial feature point corresponding to a center on the lower side of the eye.

When small regions 432 and 442 are set to these sizes, the eyebrow region is more surely included in the intermediate region, but the eye region is more surely not included in the intermediate region.

Herein, the position at a center point of each of small regions 432 and 442 is not necessarily matched with the facial feature point, but small regions 432 and 442 may be located so as to include the eyebrow region and the eye region in consideration of the diameters, respectively. For example, the positions at the center points of small regions 432 associated with the eyebrow may be disposed along a center line of the eyebrow that is estimated based on the eyebrow feature points. In this case, for example, a number of small regions 432 associated with the eyebrow is set to seven, and small regions 432 associated with the eyebrow are disposed at equal intervals on the center line of the eyebrow. Then, the diameter of small region 432 associated with the eyebrow is set to two-thirds of the distance between the two facial feature points on the upper side of the eyebrow. Note that, even in this case, the diameter of small region 432 is desirably set smaller than other regions with respect to the facial feature point of the outer end (and inner end) of the eyebrow (for example, a half diameter).

Through the technique, eyebrow region extracting unit 250 can set the region to the intermediate region with less processing load such that the eyebrow region is more surely included in the region, and such that the eye region is more surely not included in the region. Eyebrow region extracting unit 250 can accurately extract the eyebrow region by searching the edge of the eyebrow in the intermediate region of the binary image.

However, because actually a boundary between the eyebrow and the skin is indistinct, sometimes the edge of the eyebrow of the binary image is located inside an outer rim of the actual eyebrow.

Therefore, based on the binary eyebrow region estimated from the binary image, eyebrow region extracting unit 250 more surely extracts the region including the outer rim of the actual eyebrow as the eyebrow region.

<Eyebrow Region Extracting Technique>

FIG. 8 is a view illustrating an example of a technique of extracting the eyebrow region based on the binary eyebrow region estimated from the binary image.

Figure 8A:
FIG. 8A is a view illustrating an example of an eyebrow region extracting technique according to the second exemplary embodiment.
Figure 8B:
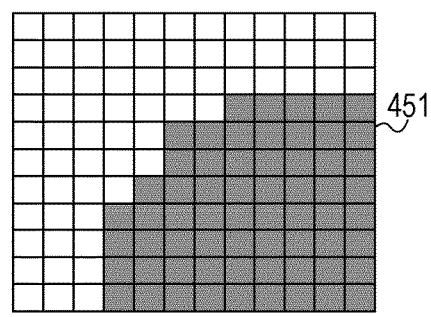
FIG. 8B is a view illustrating an example of an eyebrow region extracting technique according to the second exemplary embodiment.

For example, binary eyebrow region 451 is estimated from the binary image as illustrated in FIG. 8(A). FIG. 8(B) is a partially enlarged view of binary eyebrow region 451 illustrated in FIG. 8(A).

Figure 8C:
FIG. 8C is a view illustrating an example of an eyebrow region extracting technique according to the second exemplary embodiment.
Figure 8D:
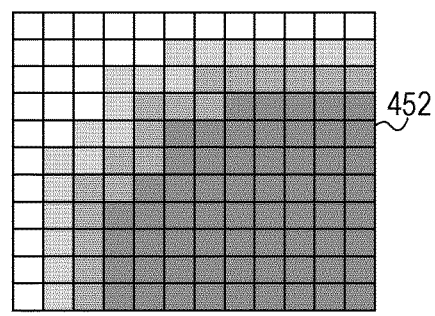
FIG. 8D is a view illustrating an example of an eyebrow region extracting technique according to the second exemplary embodiment.

Eyebrow region extracting unit 250 expands binary eyebrow region 451 illustrated in FIG. 8(A) so as to more surely include the outer rim of the actual eyebrow. FIGS. 8(C) and 8(D) illustrate the eyebrow region when binary eyebrow region 451 illustrated in FIGS. 8(A) and 8(B) is expanded by enlarging the region by two pixels in the vertical and horizontal directions. Herein, in FIG. 8(D), a gray region is the region enlarged by the expansion.

Herein, an expansion amount (width, the number of stages, or the number of pixels) may be a fixed value or a variable value. For example, eyebrow region extracting unit 250 may vary the expansion amount according to the distance between the inner ends of the left and right eyebrows. However, desirably the expansion amount is set to the range not to include the eye region and the region of the hair.

Through the technique, eyebrow region extracting unit 250 can extract the region more surely including the actual eyebrow region as the eyebrow region.

<Eyebrow Erasing Processing>

First, eyebrow eraser 260 deletes the eyebrow region from the photographed image by initializing the pixel value in the eyebrow region with respect to the photographed image. Then, eyebrow eraser 260 moves a frame of 2w+1 (w is an integer of 1 or more, for example, w is 2) pixels×2w+1 pixels on the photographed image. In the case where the center pixel of the frame (hereinafter, referred to as an "interpolation frame") is the pixel in the eyebrow region, eyebrow eraser 260 interpolates a pixel value (color) of the center pixel using a pixel value (color) in a region other than the eyebrow region (hereinafter, also referred to as a "non-eyebrow region") located in the interpolation frame.

Figure 9:
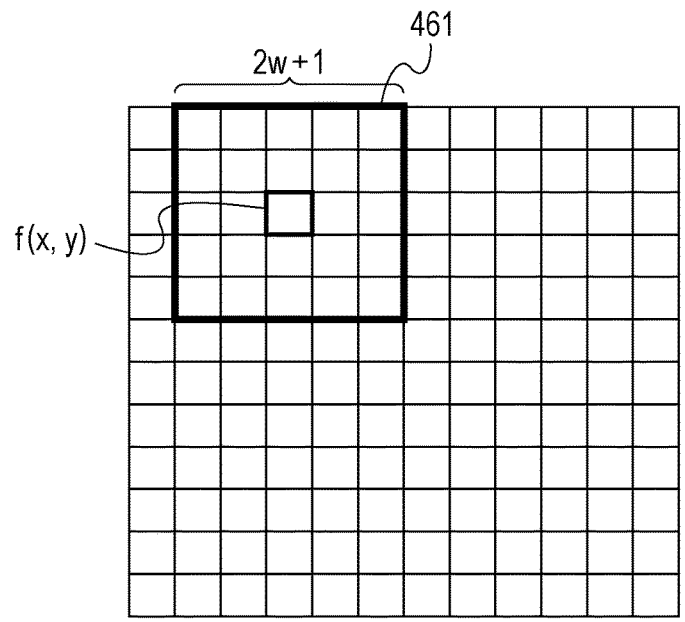
FIG. 9 is a view illustrating an example of an interpolation frame according to the second exemplary embodiment.

FIG. 9 is a view illustrating an example of the interpolation frame.

FIG. 9 illustrates interpolation frame 461 in the case of w=2. Hereinafter, a pixel position in the photographed image is expressed by a coordinate value of an xy-coordinate system. The pixel value (color) of the pixel located at coordinates (x, y) is expressed by f(x, y) as illustrated in FIG. 9.

Eyebrow eraser 260 generates an eyebrow mask in order to delete the eyebrow region from the photographed image.

Figure 10:
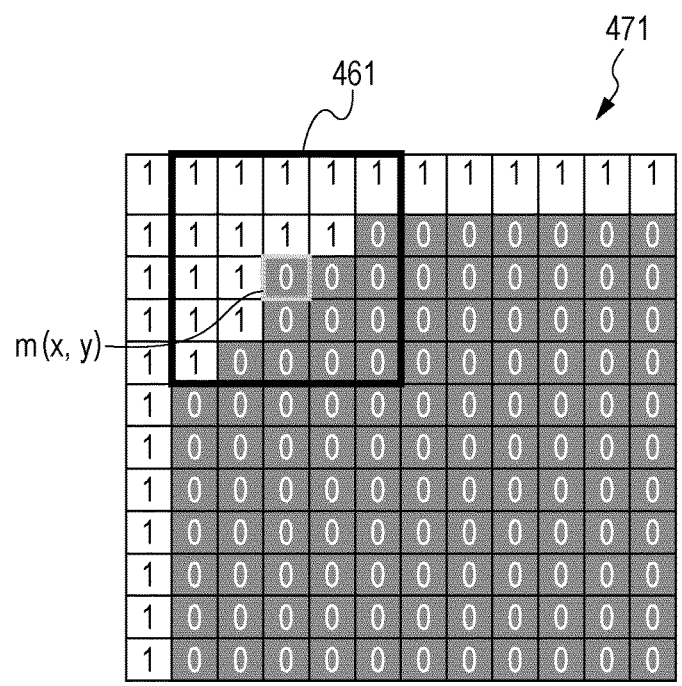
FIG. 10 is a view illustrating an example of an eyebrow mask according to the second exemplary embodiment.

FIG. 10 is a view partially illustrating an example of the eyebrow mask. For reference, interpolation frame 461 is also illustrated in FIG. 10.

As illustrated in FIG. 10, for example, eyebrow mask 471 includes a set of eyebrow mask values m(x, y) set to pixels. The eyebrow mask value m(x, y) of 1 is set to each pixel in the non-eyebrow region while the eyebrow mask value m(x, y) of 0 is set to each pixel in the eyebrow region.

In the example of FIG. 10, interpolation frame 461 has the eyebrow mask value m(x, y) of "0" of the center pixel and the eyebrow mask value m(x, y) of "1" of 14 pixels on the upper left side. In this case, a pixel value g(x, y) of the center pixel is interpolated using the pixel values of 14 pixels on the upper left side.

Specifically, eyebrow eraser 260 calculates the pixel value g(x, y) of the center pixel (x, y) of interpolation frame 461 using the following equation (1).

[Mathematical expression 1]

$$g(x, y) = \sum_{i=-w}^{w} \sum_{j=-w}^{w} f(x+i, y+j) m(x+i, y+j) h(x+i, y+j) \qquad (1)$$

Where h is an interpolation coefficient. In the case where an average value of the pixel values in the non-eyebrow region of interpolation frame 461 is used in the interpolation, interpolation coefficient h is interpolation coefficient havg(x, y), and expressed by the following equation (2).

[Mathematical expression 2]

$$h_{avg}(x, y) = \frac{1}{\sum_{i=-w}^{w} \sum_{j=-w}^{w} m(x+i, y+j)} \qquad (2)$$

Then, eyebrow mask 471 rewrites the eyebrow mask value m of the pixel of eyebrow mask 471 into "1" every time the pixel in the eyebrow region is interpolated. This pixel interpolation result is used to interpolate the pixel value in another eyebrow region.

Eyebrow eraser 260 interpolates the pixel in the eyebrow region while moving the interpolation frame 461 from the inner end side of the eyebrow toward the outer end side of the eyebrow, thereby performing the eyebrow erasing processing.

Figure 11:
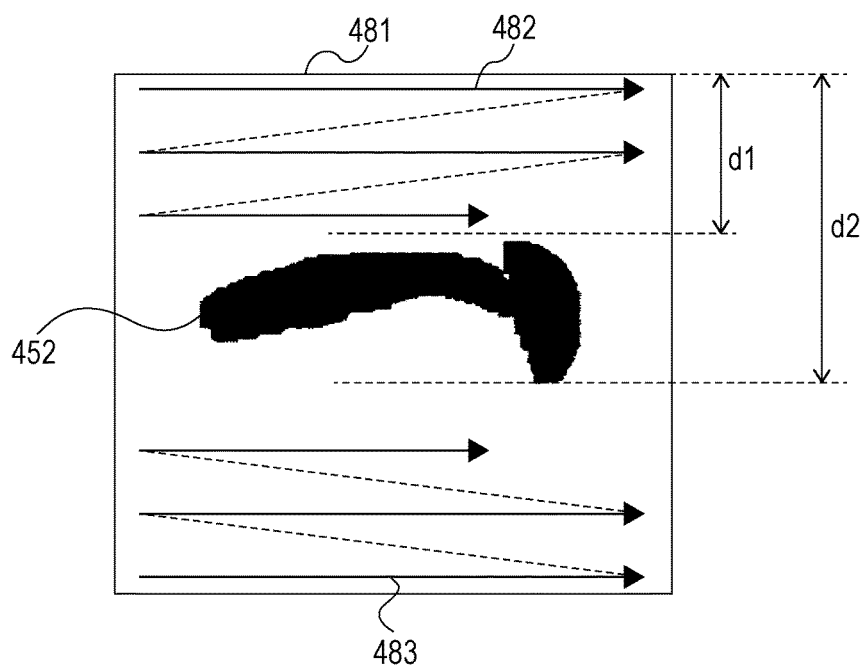
FIG. 11 is a view illustrating a moving pattern of the interpolation frame according to the second exemplary embodiment.

FIG. 11 is a view illustrating a moving pattern of interpolation frame 461.

Eyebrow eraser 260 interpolates the pixel of the eyebrow region while moving interpolation frame 461 using first pattern 482 and second pattern 483 with respect to the whole image in rectangular region 481 including eyebrow region 452.

First pattern 482 is a moving pattern that moves a line, in which interpolation frame 461 is moved, from the upper side of the eyebrow toward the lower side of the eyebrow. In first pattern 482, the interpolation is mainly performed based on the skin color on the upper side of the eyebrow. That is, the processing of interpolating the pixel in the eyebrow region using first pattern 482 is processing (first processing) of sequentially interpolating the color of the image in which the image of eyebrow region 452 is deleted from the facial image, in the direction from the upper side of the eyebrow toward the lower side of the eyebrow.

Second pattern 483 is a moving pattern that moves a line, in which interpolation frame 461 is moved, from the lower side of the eyebrow toward the upper side of the eyebrow. In second pattern 483, the interpolation is mainly performed based on the skin color on the lower side of the eyebrow. That is, the processing of interpolating the pixel in the eyebrow region using second pattern 483 is processing (second processing) of sequentially interpolating the color of the image in which the image of eyebrow region 452 is deleted from the facial image, in the direction from the lower side of the eyebrow toward the upper side of the eyebrow.

Herein, in the following description, it is assumed that d1 is a distance from the upper end of rectangular region 481 to the upper end of eyebrow region 452, and that d2 is a distance from the upper end of rectangular region 481 to the lower end of eyebrow region 452.

Eyebrow eraser 260 independently interpolates the eyebrow region using both first pattern 482 and second pattern 483, and combines two results obtained by both first pattern 482 and second pattern 483. That is, eyebrow eraser 260 combines a first image obtained by first pattern 482 (first processing) and a second image obtained by second pattern 483 (second processing).

More specifically, for example, eyebrow eraser 260 calculates finally-interpolated pixel value G(x, y) in the eyebrow region using the following equation (3) of alpha (α) blend. Where g1(x, y) is a pixel value (color) interpolated by the movement of rectangular region 481 using first pattern 482. Where, g2(x, y) is a pixel value (color) interpolated by the movement of rectangular region 481 using second pattern 483.

[Mathematical expression 3]

$$G(x,y) = \alpha(x,y) g1(x,y) + \{1 - \alpha(x,y)\} g2(x,y) \qquad (3)$$

An α value is used to determine a ratio in combining the pixel value g1(x, y) and the pixel value g2(x, y), and corresponds to a weight of the pixel value g1(x, y). For example, the α value is a variable value corresponding to the pixel position.

Figure 12:
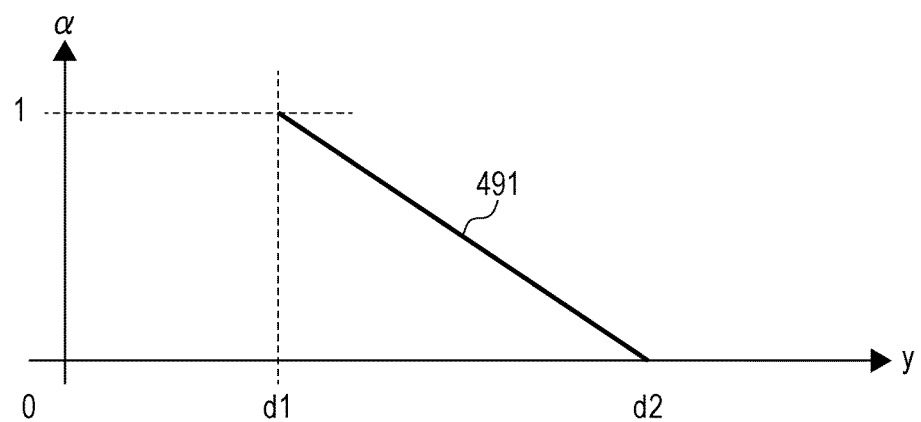
FIG. 12 is a view illustrating an example of an cc value used in interpolation of an eyebrow region according to the second exemplary embodiment.

FIG. 12 is a view illustrating an example of the cc value used to interpolate the eyebrow region. In FIG. 12, a horizontal axis indicates a distance from an upper end of rectangular region 481, and a vertical axis indicates the α value.

As indicated by line segment 491 in FIG. 12, the α value becomes "1" at the upper end (d1) of eyebrow region 452, decreases linearly toward a lower portion of rectangular region 481, and becomes "0" at the lower end (d2) of eyebrow region 452.

Herein, for example, the α value is expressed by the following equation (4).

[Mathematical expression 4]

$$\alpha(y) = \frac{d2 - y}{d2 - d1} \qquad (4)$$

Even if the upper side and lower side of the eyebrow region differ from each other in the skin color, the setting of the α value enables eyebrow eraser 260 to interpolate each pixel in the eyebrow region such that the color changes continuously between the colors on the upper side and lower side of the eyebrow region. That is, eyebrow eraser 260 can determine the pixel value of each pixel with the color closer to the skin color in the eyebrow region where the eyebrow hairs are actually erased. As a result, eyebrow eraser 260 can more naturally erase the eyebrow.

Herein, the upper end (d1) in eyebrow region 452 and the lower end (d2) in eyebrow region 452 may be set to the upper end and lower end of a pixel group having the identical x-coordinate value in eyebrow region 452. That is, eyebrow eraser 260 may finely divide eyebrow region 452 in the vertical direction, and determine the α value based on the upper end and lower end of eyebrow region 452 in each divided region. This corresponds to the combination of the first image obtained by first pattern 482 (first processing) and the second image obtained by second pattern 483 (second processing) with a combination ratio corresponding to the position relative to eyebrow region 452. In this case, eyebrow eraser 260 can more accurately exclude the non-eyebrow region adjacent to the eyebrow region from the target of the alpha blend processing.

Eyebrow eraser 260 pastes only an image part of the eyebrow region 452 in the image obtained as a combination result to a corresponding part of the original photographed image. That is, in the image of rectangular region 481 on which the eyebrow erasing processing is already performed, eyebrow eraser 260 pastes the image of eyebrow region 452 to the corresponding region of the photographed image.

<Contents of Makeup Table and Makeup Information Table>

FIG. 13 is a view illustrating an example of contents of a makeup table stored in makeup information storage 270.

As illustrated in FIG. 13, makeup pattern 501 and makeup ID 502 are stored in makeup table 500 in correlation with each other. Although simplified in FIG. 13, specifically makeup pattern 501 includes text information, such as "cute" and "cool", which expresses an impression associated with the makeup.

Herein, makeup selector 280 receives the makeup selection manipulation from the user by displaying the text information such as "cute" and "cool" of makeup pattern 501 as an option.

FIG. 14 is a view illustrating an example of contents of the makeup information table stored in makeup information storage 270.

As illustrated in FIG. 14, for example, makeup ID 511, makeup type 512, color 513, density 514, and area 515 are stored in makeup information table 510 while correlated with one another.

Makeup ID 511 corresponds to makeup ID 502 (see FIG. 13) of makeup table 500. Although simplified in FIG. 14, specifically makeup type 512 includes "eyebrow-paint", "foundation", "eye shadow", "lipstick", "cheek makeup", and the like. Although simplified in FIG. 14, specifically color 513 includes an RGB value, glossiness, and the like. Although simplified in FIG. 14, specifically density 514 includes permeability during the superimposition on the facial image, a gradation method, and the like. Although simplified in FIG. 14, specifically area 515 includes a relative coordinate group from the facial feature points, a set of a relative position and a radius of the center point with respect to the facial feature points, and the like.

A set of color 513, density 514, and area 515 includes at least information necessary for visualization of a state in which the makeup is applied to the face. That is, in the second exemplary embodiment, it is assumed that the makeup information includes at least information (information indicating a difference from the facial color) necessary for the generation of the image, in which the makeup is applied to the face, from the facial image.

A latest makeup changes quickly, and makeup to be presented also changes quickly. Therefore, for example, desirably makeup table 500 and makeup information table 510 are periodically updated from a server on the Internet through a communication circuit (not illustrated) provided in makeup supporting device 100. Makeup table 500 illustrated in FIG. 13 and makeup information table 510 illustrated in FIG. 14 may be integrated into one table.

<Simulation Image Generating Technique>

Makeup presentation unit 290 generates the simulation image by superimposing the makeup image of the selected makeup on the image in which the eyebrows are erased. For example, the makeup image is generated based on the facial component information and the makeup information.

Herein, for example, the image superimposition in the simulation image is performed by well-known image combination processing such as alpha (α) blend processing. In this case, the α value is set to a value corresponding to the makeup density. For example, the alpha blend processing is expressed by the following equations (5) to (7). Where r1, g1, and b1 are RGB values in any region of the image in which the eyebrows are erased. Where, r2, g2, and b2 are RGB values in any region of the makeup image. Where, R, G, and B are RGB values in the corresponding region of the simulation image.

$$R = r2 \times \alpha + r1 \times (1-\alpha) \qquad (5)$$

$$G = g2 \times \alpha + g1 \times (1-\alpha) \qquad (6)$$

$$B = b2 \times \alpha + b1 \times (1-\alpha) \qquad (7)$$

Moreover, it is assumed that order in a case where makeup is applied to the face several times (hereinafter, such order is referred to as "application order") is set to each makeup, and that the makeup image is a hatching image having density corresponding to the makeup density. For example, the application order defines that cheek application should be performed after foundation application. In this case, makeup presentation unit 290 may perform superimposition of the image in such a manner that the makeup images are overlaid on the image in which the eyebrows are erased, according to the application order.

<Operation of Makeup Supporting Device>

Operation of makeup supporting device 100 will be described below.

Figure 15:
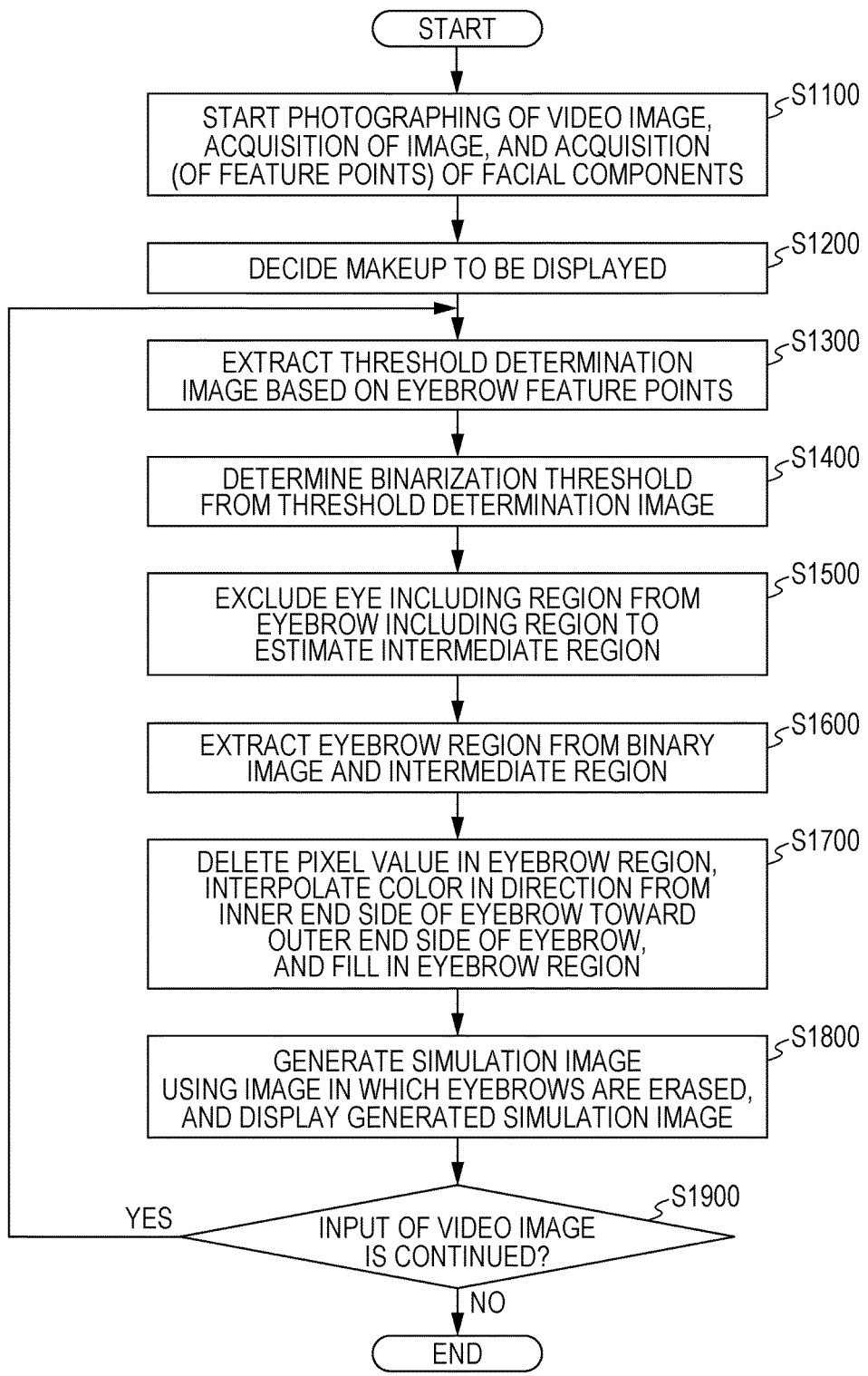
FIG. 15 is a flowchart illustrating an example of operation in the makeup supporting device according to the second exemplary embodiment.

FIG. 15 is a flowchart illustrating an example of the operation of makeup supporting device 100.

First, in step S1100, photographing unit 210 starts the photographing of the video image of the user's face, and image acquisition unit 220 starts the acquisition of the image constituting the photographed video image. At this point, desirably the user puts up the bangs. Then, facial component acquisition unit 230 starts the acquisition of the facial components of the face included in the image.

At this point, for example, facial component acquisition unit 230 analyzes the image to extract the facial feature points from the image. Facial component acquisition unit 230 acquires the regions formed by the facial feature points constituting the identical facial components as the facial component regions. Facial component acquisition unit 230 generates the facial component information from the acquired facial component regions.

Figure 16:
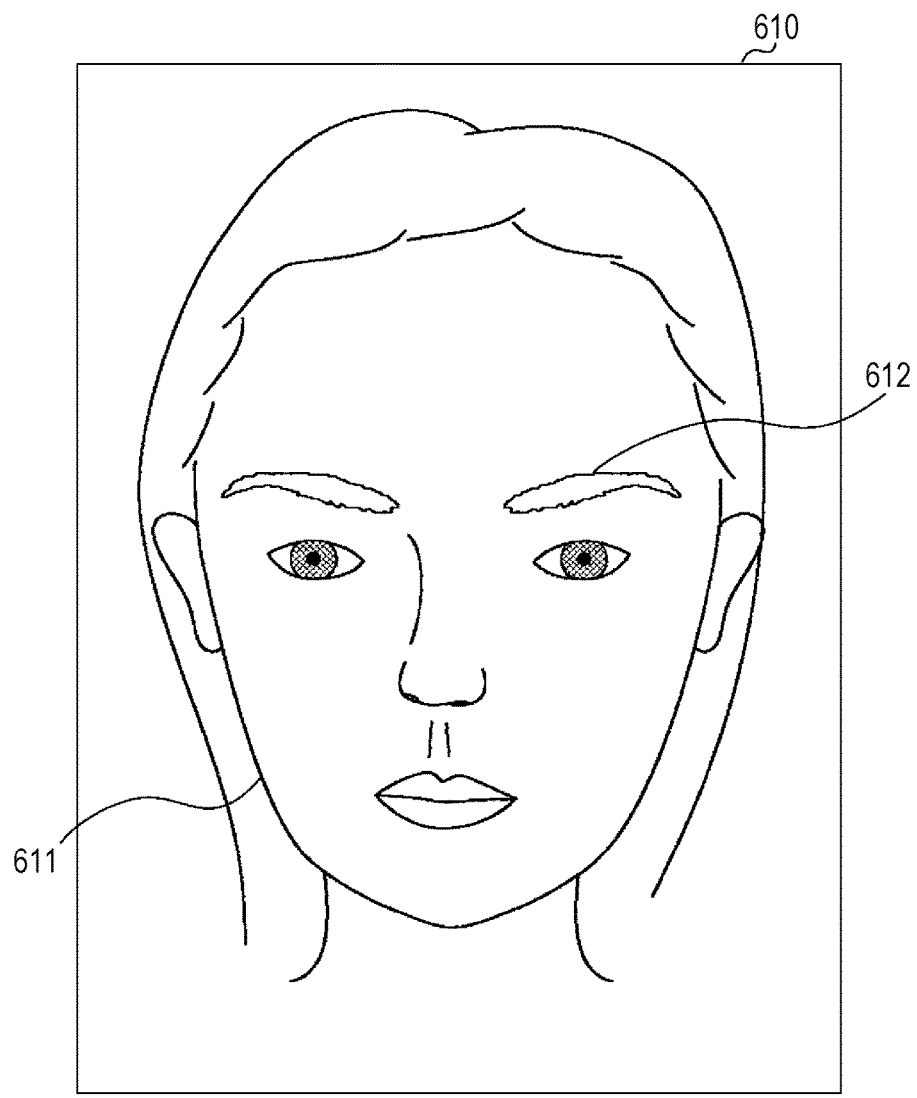
FIG. 16 is a view illustrating an example of a photographed image acquired according to the second exemplary embodiment.

FIG. 16 is a view illustrating an example of the photographed image acquired in step S1100 of FIG. 15.

As illustrated in FIG. 16, photographed image 610 includes facial image 611 of the user. The user neither puts on makeup nor removes eyebrows 612. For example, the facial feature points in FIGS. 3 and 4 are extracted from image 610 to generate the facial component information.

FIG. 17 is a view illustrating an example of the facial component information generated in step S1100 of FIG. 15.

As illustrated in FIG. 17, for example, facial component information 620 describes region 622 and person ID 623 in each facial component ID 621. Facial component ID 621 is identification information on each of facial components such as a left eye and an upper lip. Region 622 is information indicating a range of the facial component region in the image, and for example, is a set of positions of the plurality of facial feature points. For example, the positions of the facial feature points are defined using a face coordinate system that is determined based on the face. Person ID 623 is identification information on a person. For example, each time the photographing is started, and a value designated by the user is set to person ID 623 through the manipulation performed on the touch-panel-equipped display.

Then, in step S1200 of FIG. 15, makeup selector 280 selects the makeup, and outputs makeup information to makeup presentation unit 290.

Then, in step S1300, threshold determining unit 240 extracts the threshold determination image (for example, the region surrounded by rectangular region 413 in FIGS. 3 and 4) on the inner end side of the eyebrow from the facial image based on the facial feature points of the eyebrow.

Then, in step S1400, threshold determining unit 240 determines the binarization threshold based on the threshold determination image extracted in step S1300.

Then, in step S1500, eyebrow region extracting unit 250 generates the binary image (for example, binary image 421 in FIG. 5) based on the determined binarization threshold. Then, eyebrow region extracting unit 250 sets the region, where the eye including region (for example, eye including region 441 in FIG. 7) is excluded from the eyebrow including region (for example, eyebrow including region 431 in FIG. 6), to the intermediate region.

Then, in step S1600, eyebrow region extracting unit 250 extracts the eyebrow region from the binary image and the intermediate region. At this point, as described above, eyebrow region extracting unit 250 expands the binary eyebrow region (for example, binary eyebrow region 451 in FIG. 8) to obtain the eyebrow region (for example, eyebrow region 452 in FIG. 8).

Then, in step S1700, eyebrow eraser 260 performs the eyebrow erasing processing (see FIGS. 9 to 11) to generate the image in which the eyebrows are erased.

Figure 18:
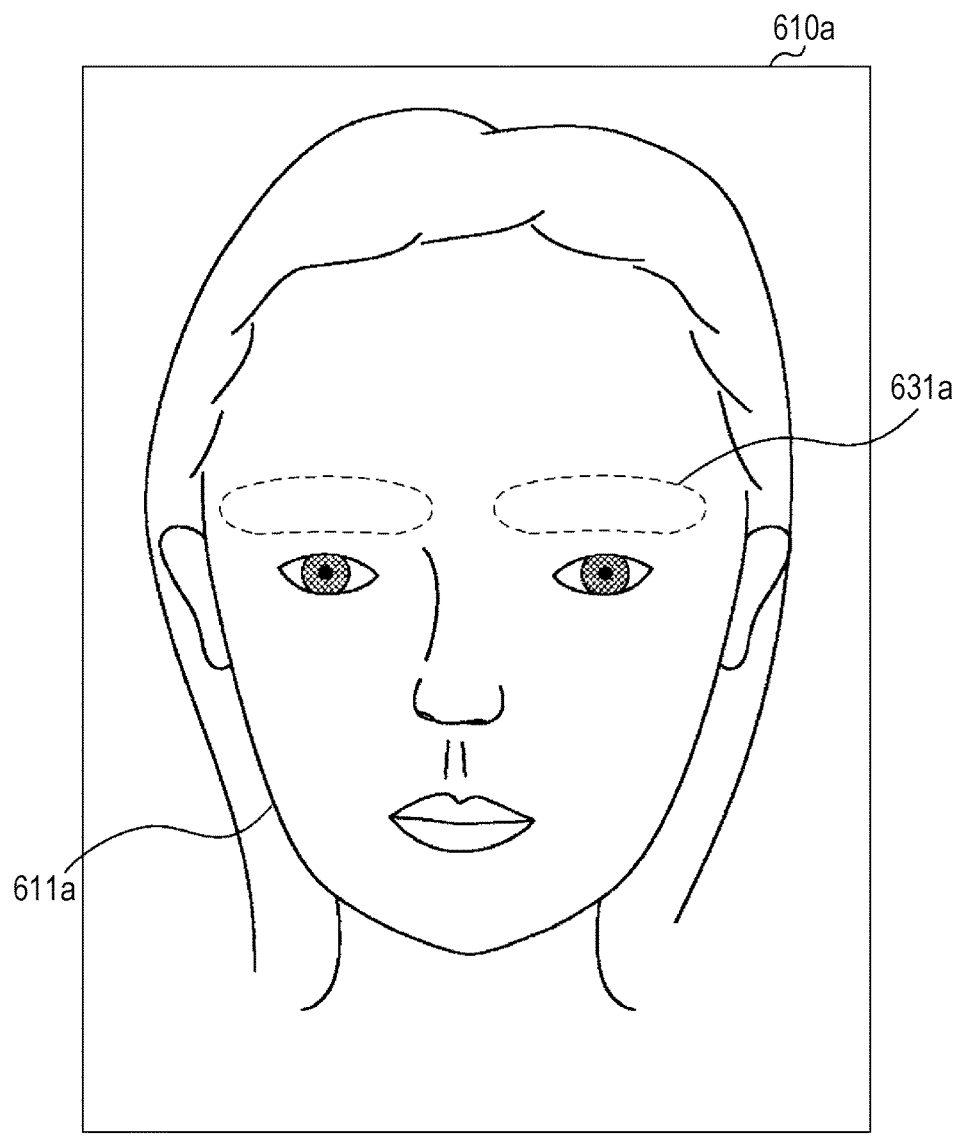
FIG. 18 is a view illustrating an example of a facial image, in which the eyebrows are erased, generated according to the second exemplary embodiment.

FIG. 18 is a view illustrating an example of the image in which the eyebrows are erased, which is generated in step S1700.

As illustrated in FIG. 18, in image 610a in which the eyebrows are erased, image 631a in the interpolated eyebrow region is pasted to the region corresponding to facial image 611a.

Then, in step S1800 of FIG. 15, makeup presentation unit 290 generates the simulation image by superimposing the image of the makeup information corresponding to the decided makeup on the image in which the eyebrows are erased. Display unit 300 then displays the generated simulation image.

Figure 19:
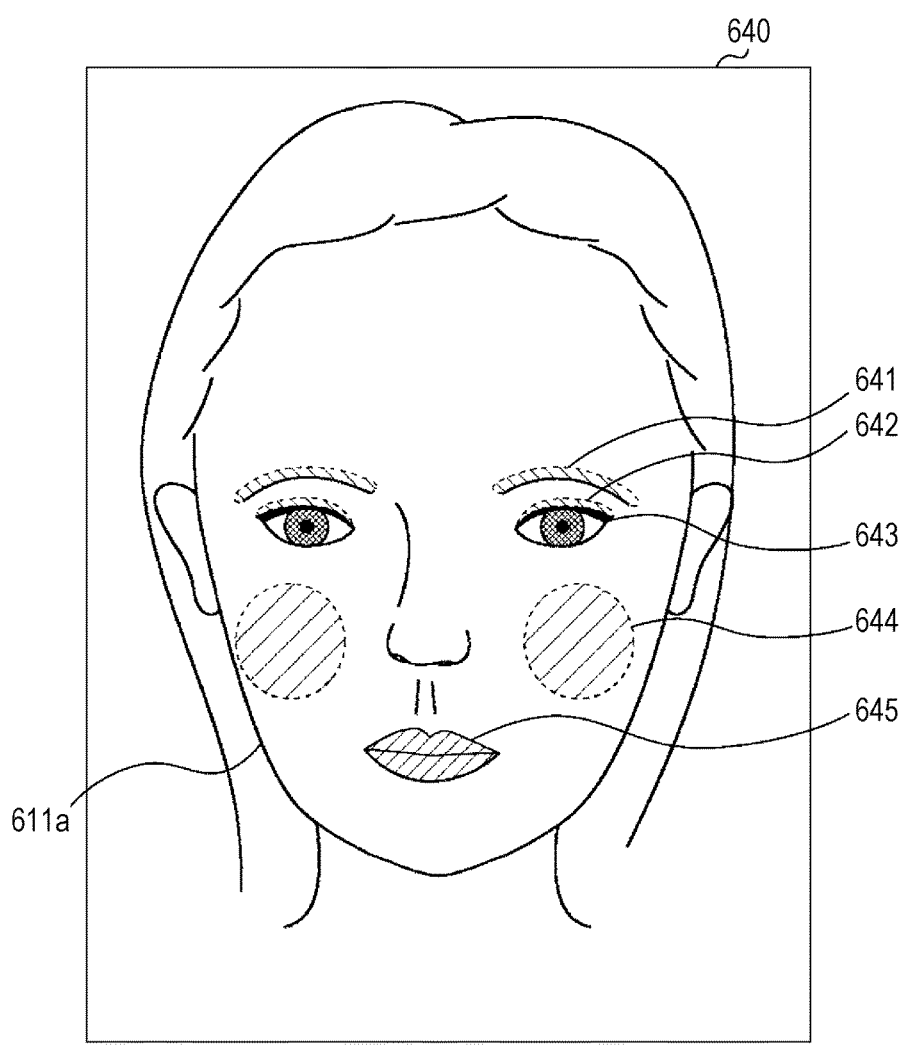
FIG. 19 is a view illustrating an example of a simulation image generated according to the second exemplary embodiment.

FIG. 19 is a view illustrating an example of the simulation image generated in step S1800 of FIG. 15.

As illustrated in FIG. 19, simulation image 640 is the image in which makeup images 641 to 645, such as the eyebrow-paint, eye shadow, eyeliner, cheek makeup, and lipstick images, are superimposed on facial image 611a on which the eyebrow erasing processing is already performed.

The region of eyebrow-paint 641 is largely different from the region of original eyebrows 612 (see FIG. 16). However, the state in which the eyebrow exists doubly is avoided because eyebrows 612 are completely erased. In addition, more natural simulation image 640 is obtained because the image in which the eyebrows are erased is used as close to the facial image in the case where eyebrows 612 are actually removed as possible.

Then, in step S1900 of FIG. 15, image acquisition unit 220 determines whether or not the input of the video image is continued. If the input of the video image is continued (YES in S1900), image acquisition unit 220 returns the processing to step S1300 to switch the processing to the next photographed image. If the input of the video image is ended (NO in S1900), image acquisition unit 220 ends a sequence of pieces of processing.

Herein, makeup supporting device 100 may use, for the subsequent image, the tentatively-obtained eyebrow region and interpolation results of the eyebrow region. In this case, for example, eyebrow eraser 260 stores the position of the eyebrow region relative to the facial feature points. As to other facial images, eyebrow eraser 260 moves or deforms the image in the eyebrow region based on the stored relative position according to the positions of the facial feature points in the facial image.

In this case, the pieces of processing in steps S1300 to S1700 of FIG. 15 can be eliminated after the eyebrow region and the interpolation results of the eyebrow region are obtained.

<Effects of Second Exemplary Embodiment>

As described above, makeup supporting device 100 of the second exemplary embodiment can extract and fill in the eyebrow region based on the image information about the region on the inner end side of the eyebrow, the region being closer to the eyebrow and having a higher possibility that the hair does not cover the eyebrow. Accordingly, makeup supporting device 100 can more accurately extract the eyebrow region, and fill the eyebrow region with the more proper color. Therefore, makeup supporting device 100 can obtain the image in which eyebrows are erased, the image being closer to the facial image in the case where eyebrow hairs are actually removed.

Makeup supporting device 100 of the second exemplary embodiment displays the simulation image for the makeup using the image in which the eyebrows are erased, the image being closer to the facial image in the case where eyebrow are actually removed. Therefore, makeup supporting device 100 enables the user to more properly determine the suitability of makeup.

<Another Makeup Selecting Technique>

The makeup selecting technique is not limited to the above example. For example, makeup selector 280 may automatically select the makeup suitable for the feature of the face or the latest makeup.

<Modifications of Other Configurations>

The various tables may not necessarily be stored in makeup supporting device 100. For example, in the case where makeup supporting device 100 can be connected to a network, makeup supporting device 100 may select the makeup by accessing a server, in which the table is stored, on the network.

For example, makeup supporting device 100 may be such a distributed arrangement system that only photographing unit 210 and display unit 300 from among the functional units illustrated in FIG. 2 may be provided in a terminal carried by the user, and other functional units are provided in a server on the network.

Moreover, makeup supporting device 100 may detect natural light, and acquire the facial feature points or detect the eyebrow region while an influence of the natural light is reduced from the image.

Makeup supporting device 100 may not necessarily generate the simulation image for the makeup.

Makeup supporting device 100 may present information on cosmetics necessary for the makeup to the user together with the simulation image.

A makeup supporting device of the present disclosure includes: an image acquisition unit that acquires a facial image that is an image obtained by photographing a face; a threshold determining unit that determines a pixel value threshold based on a partial image of the facial image, the partial image being an image in a region that does not include an outer end of an eyebrow but includes an inner end of the eyebrow and a periphery of the inner end of the eyebrow; an eyebrow region extracting unit that extracts an eyebrow region from the facial image using the threshold; an eyebrow eraser that performs eyebrow erasing processing on the facial image, the eyebrow erasing processing being processing of filling in the eyebrow region using preferentially a color on an inner end side of the eyebrow from among colors of regions around the eyebrow region; and a display unit that displays the facial image after the eyebrow erasing processing is performed.

Note that, the makeup supporting device may further include a makeup presentation unit that generates a simulation image by superimposing an image indicating a state of eyebrow makeup applied to the face on the facial image on which the eyebrow erasing processing is already performed. In the makeup supporting device, the display unit may display the simulation image.

In addition, in the makeup supporting device, the partial image may be an image in a region that has a predetermined size and shape based on a position of the inner end of the eyebrow.

In addition, in the makeup supporting device, the eyebrow erasing processing may be processing of sequentially interpolating a color of an image in which an image of the eyebrow region is deleted from the facial image, in a direction from the inner end side of the eyebrow toward an outer end side of the eyebrow.

In addition, in the makeup supporting device, the eyebrow erasing processing may include first processing, second processing, and third processing, the color of the image in which the image of the eyebrow region is deleted from the facial image being sequentially interpolated in a direction from an upper side of the eyebrow toward a lower side of the eyebrow in the first processing, the color of the image in which the image of the eyebrow region is deleted from the facial image being sequentially interpolated in a direction from the lower side of the eyebrow toward the upper side of the eyebrow in the second processing, a first image obtained by the first processing and a second image obtained by the second processing being combined in the third processing, and, in the third processing, the first image and the second image may be combined with a combination ratio corresponding to a position of the eyebrow region.

In addition, the makeup supporting device may further include a facial component acquisition unit that extracts eyebrow feature points and eye feature points from the facial image. In the makeup supporting device, the eyebrow region extracting unit may extract the eyebrow region from an intermediate region in the region of the facial image, an eye including region being excluded from an eyebrow including region in the intermediate region, the eye including region being a set of small regions based on positions of the eye feature points, the eyebrow including region being a set of small regions based on positions of the eyebrow feature points.

In addition, in the makeup supporting device, the eyebrow eraser may perform the eyebrow erasing processing on a whole image of a rectangular region including the eyebrow region of the facial image, and paste the image of the eyebrow region in the image of the rectangular region on which the eyebrow erasing processing is already performed into the region corresponding to the facial image.

In addition, in the makeup supporting device, the eyebrow region extracting unit may extract a region where the eyebrow region defined by the threshold is expanded as the eyebrow region.

The makeup supporting device may further include a photographing unit that photographs a video image of the face. In the makeup supporting device, the image acquisition unit may acquire an image constituting the video image, and the display unit may sequentially display the simulation image along the video image.

A makeup supporting method of the present disclosure includes: acquiring a facial image that is an image obtained by photographing a face; determining a pixel value threshold based on a partial image of the facial image, the partial image being an image in a region that does not include an outer end of an eyebrow but includes an inner end of the eyebrow and a periphery of the inner end of the eyebrow; extracting an eyebrow region from the facial image using the threshold; performing eyebrow erasing processing on the facial image, the eyebrow erasing processing being processing of filling in the eyebrow region using preferentially a color on an inner end side of the eyebrow from among the colors in regions around the eyebrow region; and displaying the facial image after the eyebrow erasing processing is performed.

A non-transitory computer-readable recording medium of the present disclosure stores a program for causing a device including a processor to perform: processing of acquiring a facial image that is an image obtained by photographing a face; processing of determining a pixel value threshold based on a partial image of the facial image, the partial image being an image in a region that does not include an outer end of an eyebrow but includes an inner end of the eyebrow and a periphery of the inner end of the eyebrow; processing of extracting an eyebrow region from the facial image using the threshold; processing of performing eyebrow erasing processing on the facial image, the eyebrow erasing processing being processing of filling in the eyebrow region using preferentially a color on an inner end side of the eyebrow from among colors in regions around the eyebrow region; and processing of displaying the facial image after the eyebrow erasing processing is performed.

The present disclosure is usefully applied to a makeup supporting device, a makeup supporting method, and a non-transitory computer-readable recording medium for being able to obtain an image in which eyebrows are erased, the image being closer to a state in which eyebrow hairs are actually removed.

What is claimed is:

1. A makeup supporting device comprising:
a memory that stores instructions; and
a processor that, when executing the instructions stored in the memory, performs operations comprising:
acquiring a facial image by photographing a face of a user, by a camera;
determining a pixel value threshold based on a partial image of the facial image, wherein the partial image does not include an outer end of an eyebrow and includes an inner end of the eyebrow and a periphery of the inner end of the eyebrow;
extracting an eyebrow region from the facial image using the pixel value threshold;
performing eyebrow erasing processing on the facial image, wherein the eyebrow erasing processing fills in the eyebrow region preferentially using a color of a peripheral region of the eyebrow region at the inner end of the eyebrow;
selecting a makeup image from makeup information stored in a storage, the makeup image including at least an area in a face and a color to be applied on the area;
generating a simulation image, by superimposing the selected makeup image on the facial image after the eyebrow erasing processing is performed; and
displaying the generated simulation image,
wherein the eyebrow region includes a first pixel and a second pixel that are located adjacent to each other, and
a distance between the first pixel and the inner end is shorter than a distance between the second pixel and the inner end,
wherein, in the eyebrow erasing processing,
a first color value of the first pixel is determined based on color values of first skin pixels that are included in the peripheral region and are located adjacent to the first pixel, and
after the first color value is determined, a second color value of the second pixel is determined based on color values of second skin pixels that are included in the peripheral region and are located adjacent to the second pixel, the second skin pixels including the first pixel having the first color value.

2. The makeup supporting device according to claim 1, wherein
the makeup image stored in the makeup information includes an eyebrow makeup image indicating an area of an eyebrow makeup and a color to be applied in the area of the eyebrow makeup,
the simulation image is generated by superimposing the eyebrow makeup image on the facial image on which the eyebrow erasing processing has already been performed, and
the generated simulation image is displayed.

3. The makeup supporting device according to claim 1, wherein the partial image is an image in a region that has a predetermined size and shape based on a position of the inner end of the eyebrow.

4. The makeup supporting device according to claim 1, wherein the eyebrow erasing processing sequentially interpolates a color of an image, in which the eyebrow region is deleted from the facial image, in a direction from the inner end of the eyebrow toward the outer end of the eyebrow.

5. The makeup supporting device according to claim 1, wherein the eyebrow erasing processing includes first processing, second processing, and third processing,
a color of an image, in which the eyebrow region is deleted from the facial image, is sequentially interpolated in a direction from an upper side of the eyebrow toward a lower side of the eyebrow in the first processing,
the color of the image, in which the eyebrow region is deleted from the facial image, is sequentially interpolated in a direction from the lower side of the eyebrow toward the upper side of the eyebrow in the second processing,
a first image obtained by the first processing and a second image obtained by the second processing are combined in the third processing, and
in the third processing, the first image and the second image are combined with a combination ratio corresponding to a position of the eyebrow region.

6. The makeup supporting device according to claim 1, wherein the processor, when executing the instructions stored in the memory further performs operations comprising:
extracting eyebrow feature points and eye feature points from the facial image,
wherein the eyebrow region is extracted from an eyebrow vicinity region in the facial image,
wherein the eyebrow vicinity region is obtained by excluding an eye including region from an eyebrow including region, the eye including region being a set of small regions based on positions of the eye feature points, the eyebrow including region being a set of small regions based on positions of the eyebrow feature points.

7. The makeup supporting device according to claim 5, wherein the eyebrow erasing processing is performed on a whole image of a rectangular region including the eyebrow region of the facial image, and
an image of the eyebrow region in the rectangular region on which the eyebrow erasing processing has already been performed is pasted into a region of the facial image corresponding to the eyebrow region in the rectangular region.

8. The makeup supporting device according to claim 1, wherein a region where the eyebrow region defined by the threshold is expanded, is extracted as the eyebrow region.

9. The makeup supporting device according to claim 1, wherein
the camera photographs a video image of the face of the user, and the simulation image is sequentially displayed along the video image.

10. A makeup supporting method comprising:
acquiring a facial image by photographing a face of a user, by a camera;
determining a pixel value threshold based on a partial image of the facial image, wherein the partial image does not include an outer end of an eyebrow and includes an inner end of the eyebrow and a periphery of the inner end of the eyebrow;
extracting an eyebrow region from the facial image using the pixel value threshold;
performing eyebrow erasing processing on the facial image, wherein the eyebrow erasing processing fills in the eyebrow region preferentially using a color of a peripheral region of the eyebrow region at the inner end of the eyebrow;
selecting a makeup image from makeup information stored in a storage, the makeup image including at least an area in a face and a color to be applied on the area;
generating a simulation image, by superimposing the selected makeup image on the facial image after the eyebrow erasing processing is performed; and
displaying the generated simulation image,
wherein the eyebrow region includes a first pixel and a second pixel that are located adjacent to each other, and
a distance between the first pixel and the inner end is shorter than a distance between the second pixel and the inner end,
wherein, in the eyebrow erasing processing,
a first color value of the first pixel is determined based on color values of first skin pixels that are included in the peripheral region and are located adjacent to the first pixel, and
after the first color value is determined, a second color value of the second pixel is determined based on color values of second skin pixels that are included in the peripheral region and are located adjacent to the second pixel, the second skin pixels including the first pixel having the first color value.

11. A non-transitory computer-readable recording medium storing a program for causing a processor to perform:
acquiring a facial image obtained by photographing a face of a user, by a camera;
determining a pixel value threshold based on a partial image of the facial image, wherein the partial image does not include an outer end of an eyebrow and includes an inner end of the eyebrow and a periphery of the inner end of the eyebrow;
extracting an eyebrow region from the facial image using the pixel value threshold;
performing eyebrow erasing processing on the facial image, wherein the eyebrow erasing processing fills in the eyebrow region preferentially using a color of a peripheral region of the eyebrow region at the inner end of the eyebrow;
selecting a makeup image from makeup information stored in a storage, the makeup image including at least an area in a face and a color to be applied on the area;
generating a simulation image, by superimposing the selected makeup image on the facial image after the eyebrow erasing processing is performed; and
displaying the generated simulation image,
wherein the eyebrow region includes a first pixel and a second pixel that are located adjacent to each other, and
a distance between the first pixel and the inner end is shorter than a distance between the second pixel and the inner end,
wherein, in the eyebrow erasing processing,
a first color value of the first pixel is determined based on color values of first skin pixels that are included in the peripheral region and are located adjacent to the first pixel, and
after the first color value is determined, a second color value of the second pixel is determined based on color values of second skin pixels that are included in the peripheral region and are located adjacent to the second pixel, the second skin pixels including the first pixel having the first color value.

12. The makeup supporting device according to claim 2, a position of the eyebrow makeup image to be superimposed on the facial image is determined based on the area of the eyebrow makeup of the selected makeup image, irrespective of the extracted eyebrow region.

13. The makeup supporting device according to claim 1, wherein the simulation image is generated by using the following equations:

$$R = r2 \times \alpha + r1 \times (1-\alpha);$$

$$G = g2 \times \alpha + g1 \times (1-\alpha); \text{ and}$$

$$B = b2 \times \alpha + b1 \times (1-\alpha)$$

where, r1, g1, and b1 are RGB values in a region of the facial image on which the eyebrow erasing processing has already been performed; r2, g2, and b2 are RGB values in a region of the selected makeup image; R, G, and B are RGB values in a corresponding region of the simulation image; and α is a predetermined value determined based on makeup density.

14. The makeup supporting device according to claim 1, wherein the second color value g(x, y) of the second pixel (x,y) is determined based on the following equation:

$$g(x, y) = \sum_{i=-w}^{w} \sum_{j=-w}^{w} f(x+i, y+j) m(x+i, y+j) h(x+i, y+j)$$

where f indicates a pixel value of each pixel, m indicates 1 when a pixel is a skin pixel, and 0 when a pixel is in the eyebrow region, and h is an interpolation coefficient.

* * * * *